US010917199B2

(12) United States Patent
Sun et al.

(10) Patent No.: US 10,917,199 B2
(45) Date of Patent: Feb. 9, 2021

(54) HYBRID AUTOMATIC REPEAT REQUEST-ACKNOWLEDGMENT HARQ-ACK FEEDBACK METHOD AND APPARATUS

(71) Applicant: Huawei Technologies Co., Ltd., Shenzhen (CN)

(72) Inventors: Wei Sun, Shenzhen (CN); Yongxia Lyu, Ottawa-Kanata (CA); Zhiheng Guo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/272,140

(22) Filed: Feb. 11, 2019

(65) Prior Publication Data
US 2019/0238275 A1 Aug. 1, 2019

Related U.S. Application Data

(63) Continuation of application No. PCT/CN2017/093789, filed on Jul. 21, 2017.

(30) Foreign Application Priority Data

Aug. 12, 2016 (CN) .......................... 2016 1 0666672

(51) Int. Cl.
*H04L 1/18* (2006.01)
*H04L 1/16* (2006.01)
*H04W 72/04* (2009.01)

(52) U.S. Cl.
CPC .......... *H04L 1/1812* (2013.01); *H04L 1/1671* (2013.01); *H04L 1/1861* (2013.01);
(Continued)

(58) Field of Classification Search
CPC ... H04L 1/1671; H04L 1/1812; H04L 1/1861; H04L 1/1864; H04L 1/1896; H04W 72/042; H04W 72/0446
See application file for complete search history.

(56) References Cited

U.S. PATENT DOCUMENTS

2013/0301490 A1* 11/2013 He .................. H04W 76/18
370/280
2014/0105076 A1 4/2014 Yang et al.
(Continued)

FOREIGN PATENT DOCUMENTS

CN 103650393 A 3/2014
EP 2903196 A1 8/2015
(Continued)

OTHER PUBLICATIONS

LG Electronics,"Processing time reduction for latency reduction," 3GPP TSG RAN WG1 Meeting #85 R1-165429, Nanjing, China, May 23-27, 2016, 7 pages.
(Continued)

*Primary Examiner* — Saad A. Waqas
(74) *Attorney, Agent, or Firm* — Slater Matsil, LLP

(57) ABSTRACT

A method includes: receiving, by the terminal device, at least one piece of downlink data and DCI corresponding to the at least one piece of downlink data, where the DCI includes first indication information, and the first indication information indicates a target transmission time interval (TTI) for transmitting HARQ-ACK feedback information corresponding to the at least one piece of downlink data; generating, by the terminal device based on second indication information, HARQ-ACK feedback information that needs to be fed back in the target TTI, where the second indication information indicates the number of bits of the HARQ-ACK that needs to be fed back in the target TTI; and (Continued)

sending, by the terminal device, the generated HARQ-ACK feedback information to the network device in the target TTI.

20 Claims, 11 Drawing Sheets

(52) U.S. Cl.
CPC .......... *H04L 1/1864* (2013.01); *H04L 1/1896* (2013.01); *H04W 72/042* (2013.01); *H04W 72/0446* (2013.01)

(56) References Cited

U.S. PATENT DOCUMENTS

| | | | |
|---|---|---|---|
| 2014/0198737 A1* | 7/2014 | Papasakellariou | H04W 74/006 370/329 |
| 2014/0269452 A1* | 9/2014 | Papasakellariou | H04L 5/0055 370/280 |
| 2015/0063179 A1 | 3/2015 | Yang et al. | |
| 2015/0222394 A1 | 8/2015 | Cheng et al. | |
| 2015/0312014 A1 | 10/2015 | Papasakellariou | |
| 2018/0026754 A1 | 1/2018 | Xia | |
| 2018/0343047 A1* | 11/2018 | He | H04B 7/0645 |

FOREIGN PATENT DOCUMENTS

| | | |
|---|---|---|
| JP | 2012110057 A | 6/2012 |
| JP | 2012129761 A | 7/2012 |
| JP | 2014501464 A | 1/2014 |
| JP | 2014519252 A | 8/2014 |
| JP | 2016509794 A | 3/2016 |
| WO | 2014059592 A1 | 4/2014 |
| WO | 2016118240 A1 | 7/2016 |
| WO | 2016119759 A1 | 8/2016 |
| WO | 2018028413 A1 | 2/2018 |

OTHER PUBLICATIONS

ZTE, "Discussion on UCI transmission on an LAA SCell," 3GPP TSG RAN WG1 Meeting #85 R1-164598, Nanjing, China, May 23-27, 2016, 4 pages.

Huawei et al., "Open issues on HARQ-ACK transmission for eCA," 3GPP TSG RAN WGI Meeting #84, R1-160286, St Julian's, Malta, Feb. 15-19, 2016, 6 pages.

LG Electronics, "PUCCH design in LAA," 3GPP TSG RAN WG1 #84bis, R1-162469, Busan, Korea, Apr. 11-15, 2016, 5 pages.

3rd Generation Partnership Project; Technical Specification Group Radio Access Network; Evolved Universal Terrestrial Radio Access (E-UTRA); Multiplexing and channel coding (Release 13); 3GPP TS 36.212 V13.2.0 (Jun. 2016), 140 pages.

* cited by examiner

HYBRID AUTOMATIC REPEAT REQUEST-ACKNOWLEDGMENT HARQ-ACK FEEDBACK METHOD AND APPARATUS

CROSS-REFERENCE TO RELATED APPLICATIONS

This application is a continuation application of International Application No. PCT/CN2017/093789, filed on Jul. 21, 2017, which claims priority to Chinese Patent Application No. 201610666672.5, filed on Aug. 12, 2016. The disclosures of the aforementioned applications are hereby incorporated by reference in their entireties.

TECHNICAL FIELD

Embodiments of this application relate to the field of communications technologies, and in particular, to a hybrid automatic repeat request-acknowledgment (HARQ-ACK) feedback method and apparatus.

BACKGROUND

A Long Term Evolution (LTE) system uses a hybrid automatic repeat request-acknowledgment (HARQ-ACK) mechanism. In both a frequency division duplex (FDD) system and in a time division duplex (TDD) system, a time sequence for feeding back a HARQ-ACK is fixed.

Specifically, in the FDD system, after receiving downlink data in subframe n, a terminal device feeds back HARQ-ACK feedback information in subframe (n+4), where n is an integer. In the TDD system, a subframe number of a downlink subframe that needs to be fed back in each uplink subframe is pre-agreed, and when downlink data sent in the downlink subframe is received, HARQ-ACK feedback information is fed back in a corresponding uplink subframe. For example, in a system in which an uplink-downlink subframe configuration is 3, it is pre-agreed that uplink subframe n is used to feed back HARQ-ACK feedback information corresponding to downlink data in two downlink subframes: subframe (n−4) and subframe (n−5).

In a process of implementing this application, the inventor finds that the foregoing process has at least the following problem.

With evolution of a communications system, a base station may flexibly perform resource scheduling. To be specific, the base station may schedule HARQ-ACK feedback information corresponding to a plurality of downlink subframes to one uplink subframe to feed back the HARQ-ACK feedback information. However, in a case of flexible scheduling, a terminal device can feed back the HARQ-ACK feedback information based on only received downlink data. However, because a packet loss may occur in a data transmission process, the number of pieces of downlink data received by the terminal device may be less than the number of pieces of downlink data actually sent by the base station. Therefore, the terminal device cannot correctly feed back the HARQ-ACK feedback information.

SUMMARY

To resolve a problem that a terminal device may be unable to correctly feed back a HARQ-ACK, embodiments of this application provide a HARQ-ACK feedback method and apparatus. The technical solutions are as follows.

According to a first aspect, a HARQ-ACK feedback method is provided. The method includes: sending, by a network device to a terminal device, at least one piece of downlink data and downlink control information (DCI) corresponding to the at least one piece of downlink data, and correspondingly, receiving, by the terminal device, the at least one piece of downlink data and the DCI corresponding to the at least one piece of downlink data. The DCI carries first indication information. The first indication information indicates a target transmission time interval (TTI) for transmitting HARQ-ACK feedback information corresponding to the at least one piece of downlink data.

Optionally, in a case of dynamic scheduling, each piece of downlink data may correspond to one piece of DCI; while in a case of semi-persistent scheduling (SPS), the at least one piece of downlink data may correspond to a same piece of DCI, and this is not limited herein.

In addition, the first indication information may be a feedback delay of the at least one piece of downlink data, and the feedback delay is a time difference between the target TTI and a TTI for transmitting downlink data. Optionally, the first indication information may alternatively be an index of the target TTI for feeding back the HARQ-ACK feedback information corresponding to the downlink data. The target TTI is a TTI used for feeding back the HARQ-ACK feedback information corresponding to the downlink data.

The HARQ-ACK feedback information indicates a reception status of the at least one piece of downlink data. The reception status may be a reception success or a reception failure.

After the terminal device receives the at least one piece of downlink data and the corresponding DCI, the terminal device may determine, based on the first indication information in the DCI, the target TTI for feeding back the HARQ-ACK feedback information corresponding to the downlink data, and generate the HARQ-ACK feedback information that is sent to the network device in the target TTI. Second indication information indicates the number of bits of the HARQ-ACK feedback information that needs to be fed back in the target TTI.

After generating the HARQ-ACK feedback information that needs to be fed back, the terminal device feeds back the generated HARQ-ACK feedback information to the network device in the target TTI. Correspondingly, the network device may receive the HARQ-ACK feedback information fed back by the terminal device in the target TTI, and after receiving the HARQ-ACK feedback information, decode the HARQ-ACK feedback information based on the second indication information. Optionally, when feeding back the generated HARQ-ACK feedback information, the terminal device may perform coding and modulation on the determined HARQ-ACK feedback information, map the HARQ-ACK feedback information to an uplink channel, and send the HARQ-ACK feedback information to the network device using the uplink channel.

After the at least one piece of downlink data and the DCI corresponding to the at least one piece of downlink data sent by the network device are received, the target TTI is determined based on the first indication information in the DCI. Then, the HARQ-ACK feedback information that needs to be fed back in the target TTI is generated, and the generated HARQ-ACK feedback information is fed back to the network device in the target TTI. This resolves a problem that a terminal device cannot correctly feed back HARQ-ACK feedback information. Therefore, The terminal device can still correctly feed back HARQ-ACK feedback information corresponding to a lost packet even though there is a packet loss after a last piece of downlink data is received and before the target TTI.

The second indication information is information pre-agreed between the network device and the terminal device. Specifically, the second indication information may be information preset in the network device and the terminal device, information sent by the network device to the terminal device by the DCI, information sent by the network device to the terminal device by a system message or radio resource control (RRC) signaling, or information reported by the terminal device.

In a possible implementation, the second indication information includes a preset feedback delay, and the second indication information indicates the number of bits of the HARQ-ACK feedback information by the preset feedback delay.

In another possible implementation, the network device may further specify a total number of bits of the HARQ-ACK feedback information that needs to be fed back in the target TTI in which the HARQ-ACK feedback information corresponding to the downlink data is fed back. To be specific, the second indication information may be further used to indicate the total number of bits of the HARQ-ACK feedback information that needs to be fed back in the target TTI in which the HARQ-ACK feedback information corresponding to the downlink data is fed back.

In still another possible implementation, the generating, by the terminal device, the HARQ-ACK feedback information that needs to be fed back in the target TTI may include: determining, by the terminal device based on each piece of downlink data and first indication information corresponding to each piece of downlink data received before the target TTI, first HARQ-ACK feedback information that needs to be fed back in the target TTI; detecting, by the terminal device based on the preset feedback delay and first indication information corresponding to a last piece of downlink data received before the target TTI, whether there is downlink data that has not been received after the last piece of downlink data is received and before the target TTI; and if a detection result is that there is downlink data that has not been received, determining, by the terminal device based on a detected number of pieces of downlink data that have not been received, second HARQ-ACK feedback information that needs to be fed back in the target TTI.

In actual implementation, the DCI may further include an index of the downlink data. In this case, the determining, by the terminal device, first HARQ-ACK feedback information may include: for each piece of downlink data, determining, by the terminal device based on a demodulation result of the downlink data, HARQ-ACK corresponding to the downlink data; detecting, by the terminal device based on an index of each piece of received downlink data, whether there is a packet loss; and if a detection result is that there is a packet loss, detecting, by the terminal device, that HARQ-ACK corresponding to lost downlink data is a NACK.

If the network device uses semi-persistent scheduling, the determining, by the terminal device, first HARQ-ACK feedback information may include: for each piece of downlink data, determining, by the terminal device based on a demodulation result of the downlink data, HARQ-ACK corresponding to the downlink data; after the terminal device receives the DCI, detecting whether there is a packet loss at each preset time interval before the target TTI; and if a detection result is that there is a packet loss, determining, by the terminal device, that HARQ-ACK corresponding to lost downlink data is a NACK.

In still another possible implementation, because the terminal device determines that there may be at least two pieces of HARQ-ACK feedback, feeding back, by the terminal device, the determined HARQ-ACK feedback information to the network device may include: feeding back, to the network device in the target TTI, the HARQ-ACK feedback sorted according to a preset order, where the preset order is an order that is pre-agreed between the terminal device and the network device.

All pieces of HARQ-ACK feedback sorted according to the preset order are fed back, and the preset order is an order that is agreed between the terminal device and the network device. Therefore, the network device can accurately learn, based on the received HARQ-ACK feedback information, specific data that is successfully sent and specific data that is unsuccessfully sent.

It should be noted that the steps on a network device side may be independently implemented as the HARQ-ACK feedback method on the network device side, and the steps on a terminal device side may be independently implemented as the HARQ-ACK feedback method on the terminal device side.

According to a second aspect, a HARQ-ACK feedback apparatus is provided. The HARQ-ACK feedback apparatus includes at least one unit, and the at least one unit is configured to implement the HARQ-ACK feedback apparatus on the network device side in the first aspect.

According to a third aspect, a HARQ-ACK feedback apparatus is provided. The HARQ-ACK feedback apparatus includes at least one unit, and the at least one unit is configured to implement the HARQ-ACK feedback apparatus on the terminal device side in the first aspect.

According to a fourth aspect, this application provides a HARQ-ACK feedback apparatus. The apparatus includes a processor and a memory. The memory stores at least one instruction, at least one program segment, a code set, or an instruction set. The at least one instruction, the at least one program segment, the code set, or the instruction set is loaded and executed by the processor to implement the HARQ-ACK feedback method on the network device side in the first aspect.

According to a fifth aspect, this application provides a computer readable storage medium. The storage medium stores at least one instruction, at least one program segment, a code set, or an instruction set. The at least one instruction, the at least one program segment, the code set, or the instruction set is loaded and executed by a processor to implement the HARQ-ACK feedback method on the network device side in the first aspect.

According to a sixth aspect, this application provides a HARQ-ACK feedback apparatus. The apparatus includes a processor and a memory. The memory stores at least one instruction, at least one program segment, a code set, or an instruction set. The at least one instruction, the at least one program segment, the code set, or the instruction set is loaded and executed by the processor to implement the HARQ-ACK feedback method on the terminal device side in the first aspect.

According to a seventh aspect, this application provides a computer readable storage medium. The storage medium stores at least one instruction, at least one program segment, a code set, or an instruction set. The at least one instruction, the at least one program segment, the code set, or the instruction set is loaded and executed by a processor to implement the HARQ-ACK feedback method on the terminal device side in the first aspect.

DETAILED DESCRIPTION OF ILLUSTRATIVE EMBODIMENTS

To make the objectives, technical solutions, and advantages of the embodiments of this application clearer, the following describes the technical solutions in the embodiments of this application with reference to the accompanying drawings in the embodiments of this application. Apparently, the described embodiments are merely a part rather than all of the embodiments of this application. All other embodiments obtained by persons of ordinary skill in the art based on the embodiments of this application without creative efforts shall fall within the protection scope of this application.

Figure 1:
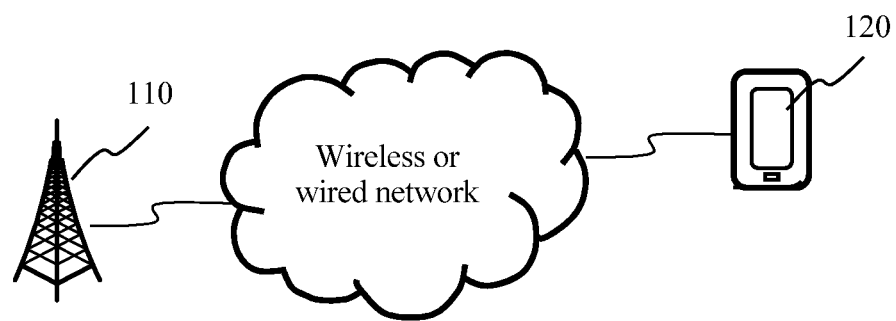
FIG. 1 is a schematic diagram of an implementation environment used in embodiments of this application.

FIG. 1 is a schematic diagram of an implementation environment in which a HARQ-ACK feedback method is used according to embodiments of this application. As shown in FIG. 1, the implementation environment may include a network device no and a terminal device 120.

The network device 110 may be a base station, a server, or a terminal device. An example in which the network device is a base station is used in the following embodiments. In actual implementation, the network device may be connected to the terminal device 120 using a wired or wireless network.

The terminal device 120 may be a device such as a mobile phone, a tablet computer, or an e-reader.

Figure 2:
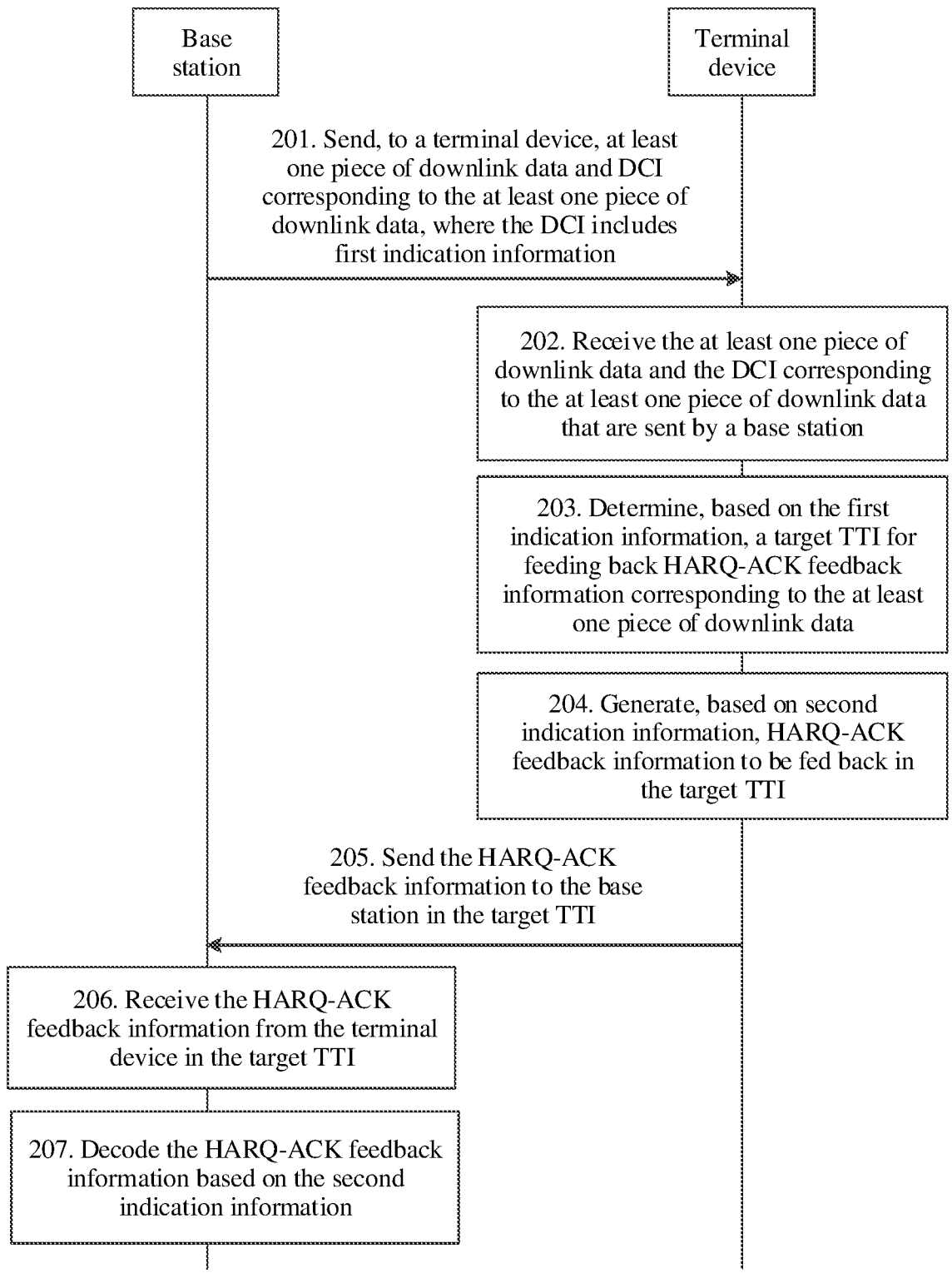
FIG. 2 is a flowchart of a HARQ-ACK feedback method according to an embodiment of this application.

FIG. 2 is a flowchart of a HARQ-ACK feedback method according to an embodiment of this application. An example in which the HARQ-ACK feedback method is used in the implementation environment shown in FIG. 1 is used for description in this embodiment. As shown in FIG. 2, the HARQ-ACK feedback method may include the following steps.

Step 201: A base station sends, to a terminal device, at least one piece of downlink data and downlink control information (DCI) corresponding to the at least one piece of downlink data, where the DCI includes first indication information.

The first indication information indicates a target transmission time interval (TTI) for transmitting HARQ-ACK feedback information corresponding to the at least one piece of downlink data. Specifically, the first indication information may include the following two types.

A first type is a feedback delay of the at least one piece of downlink data, where the feedback delay is a time difference between a TTI for transmitting the at least one piece of downlink data and a target TTI for feeding back the HARQ-ACK feedback corresponding to the downlink data.

The time difference may be represented using the number of TTIs. For example, the first indication information may be K, and a length of K TTIs is the time difference, where K is an integer greater than or equal to 0. It should be noted that, a length of the TTI may be a length of a downlink TTI, a length of an uplink TTI, or a length of another type of TTI. A type of the TTI may be pre-agreed between a base station side and a terminal device side. This is not limited in this application.

Optionally, the time difference may be alternatively represented using the number of subframes. For example, the first indication information may be J, and J×t is the time difference, where J is an integer greater than or equal to 0, and t is a subframe length of one subframe. It should be noted that, the subframe length may be a length of a downlink subframe, a length of an uplink subframe, or a length of another type of subframe. A type of a subframe may be pre-agreed between the base station side and the terminal device side. This is not limited in this application.

Optionally, the time difference may be represented using an absolute time. For example, the first indication information may be M, and M×Ts is the time difference, where M is an integer greater than or equal to 0, and Ts is a time unit pre-agreed between the base station and the terminal device. A unit of Ts may be millisecond, microsecond, or another value. This is not limited in this application.

A second type is an index of a target TTI for feeding back HARQ-ACK feedback corresponding to each piece of downlink data.

For example, the first indication information may be 20, and the first indication information indicates that HARQ-ACK corresponding to downlink data is fed back in a target TTI numbered 20. Optionally, the index of the TTI may be a relative number in a radio frame.

Step 202: The terminal device receives the at least one piece of downlink data and the DCI corresponding to the at least one piece of downlink data sent by the base station.

Step 203: The terminal device determines, based on the first indication information, a target TTI for feeding back HARQ-ACK feedback corresponding to the at least one piece of downlink data.

If the first indication information is a feedback delay of downlink data, after receiving the downlink data, the terminal device determines, as the target TTI, a TTI that is the feedback delay later than a TTI at which the downlink data is received.

For example, the first indication information is K, K×TTI is the feedback delay, and the terminal device determines, as the target TTI, a TTI that is K TTIs later than a TTI at which downlink data is received. For another example, the first indication information is J, J×t is the feedback delay, and the terminal device determines, as the target TTI, a TTI that is J subframes later than a TTI at which downlink data is received. For still another example, the first indication information is M, M×Ts is the feedback delay, and the terminal device determines, as the target TTI, a TTI that is a time of M×Ts later than a TTI at which downlink data is received.

If the first indication information is the index of the target TTI for feeding back the HARQ-ACK feedback corresponding to the downlink data, the terminal device directly determines a TTI corresponding to the index as the target TTI.

Step 204: The terminal device generates, based on second indication information, HARQ-ACK feedback information that needs to be fed back in the target TTI.

Specifically, after the terminal device determines the target TTI, when the terminal device generates the HARQ-ACK feedback information that needs to be fed back in the target TTI, the terminal device may determine, based on first indication information corresponding to each piece of received downlink data, downlink data corresponding to the target TTI, and generate, based on each piece of determined downlink data, the first indication information corresponding to each piece of downlink data, and the second indication information, the HARQ-ACK feedback information that needs to be fed back in the target TTI. The first indication information corresponding to each piece of downlink data indicates the target TTI.

The second indication information indicates information about the number of bits of the HARQ-ACK feedback information that needs to be fed back in the target TTI. Specifically, the second indication information may be indication information used to indicate a total number of bits of the HARQ-ACK feedback information in the target TTI, or a preset feedback delay. The preset feedback delay is a minimum difference between the TTI for transmitting the downlink data and the target TTI for feeding back the HARQ-ACK feedback corresponding to the downlink data. The preset feedback delay is a delay pre-agreed between the base station and the terminal device.

Specifically, the preset feedback delay may be indicated in the following manners.

Optionally, the preset feedback delay may be represented using an absolute time. For example, the second indication information may be m, and m×ts is the preset feedback delay, where m is an integer greater than or equal to 0, and ts is a time unit pre-agreed between the base station and the terminal device. A unit of ts may be millisecond, microsecond, or another value. This is not limited in this application.

Optionally, the preset feedback delay may be represented using the number of TTIs. For example, the second indication information may be k, and a length of k TTIs is the preset feedback delay, where k is an integer greater than or equal to 0. It should be noted that a length of the TTI may be a length of a downlink TTI, a length of an uplink TTI, or a length of another type of TTI. A type of a TTI may be pre-agreed between the base station side and the terminal device side. This is not limited in this application.

Optionally, the preset feedback delay may be alternatively represented using the number of subframes. For example, the second indication information may be j, and j×t is the preset feedback delay, where j is an integer greater than or equal to 0, and t is a subframe length of one subframe. It should be noted that, the subframe length may be a length of a downlink subframe, a length of an uplink subframe, or a length of another type of subframe. A type of a subframe may be pre-agreed between the base station side and the terminal device side. This is not limited in this application.

In actual implementation, the second indication information may be information preset by the base station and the terminal device, or information sent by the base station to the terminal device by a system message or radio resource control (RRC) signaling, or information sent by the base station to the terminal device using DCI, or information that is reported by the terminal device and that is received by the base station.

Step 205: The terminal device sends the HARQ-ACK feedback information to the base station in the target TTI.

During feeding back each piece of HARQ-ACK feedback, the terminal device may perform coding and modulation on the each piece of HARQ-ACK feedback to map the each piece of HARQ-ACK feedback to an uplink channel, and then send the HARQ-ACK feedback information to the base station. Optionally, each piece of HARQ-ACK feedback may be sent on a physical uplink control channel (PUCCH) or a physical uplink shared channel (PUSCH). This is not limited in this embodiment.

Step 206: The base station receives the HARQ-ACK feedback information from the terminal device in the target TTI.

Step 207: The base station decodes the HARQ-ACK feedback information based on the second indication information.

In conclusion, according to the HARQ-ACK feedback method provided in this embodiment, after the at least one piece of downlink data and the DCI corresponding to the at least one piece of downlink data sent by the network device are received, the target TTI is determined based on the first indication information in the DCI. Then, the HARQ-ACK feedback information that needs to be fed back in the target TTI is generated, and the generated HARQ-ACK feedback information is sent to the network device in the target TTI. This resolves a problem that a terminal device cannot correctly feed back HARQ-ACK feedback information. Therefore, the terminal device can still correctly feed back HARQ-ACK feedback information corresponding to a lost packet even though there is a packet loss after a last piece of downlink data is received before the target TTI.

In the foregoing embodiment, the base station may dynamically schedule the DCI, to schedule the HARQ-ACK feedback corresponding to the sent downlink data. Specifically, when the base station has no periodic small-sized traffic service but have only a data service such as only a File Transfer Protocol (FTP) service, the base station uses dynamic scheduling. Optionally, the base station may alternatively use SPS. Specifically, when there is only a periodic small-sized traffic service such as only a Voice over Internet Protocol (VoIP) service, SPS is used. Optionally, the base station may alternatively use both dynamic scheduling and semi-persistent scheduling. Specifically, when there are both a periodic small-sized traffic service and a data service, the base station uses dynamic scheduling and SPS. Therefore, the following separately describes the foregoing three cases.

It should be noted that, each piece of downlink data may be sent using a single code word or a plurality of code words. The HARQ-ACK feedback corresponding to each piece of downlink data may correspond to one HARQ-ACK bit. For example, downlink data is sent using L code words, and the downlink data corresponds to one HARQ-ACK bit. Alternatively, each code word corresponds to one HARQ-ACK bit. For example, the downlink data is sent using L code words, and each piece of downlink data corresponds to L HARQ-ACK bits. This is not limited in this application. An example in which downlink data corresponds to one HARQ-ACK bit is used for description in the following, unless otherwise specified.

In a first case, when the base station uses dynamic scheduling, when sending each piece of downlink data, the base station sends DCI corresponding to the downlink data. In addition, the DCI further includes an index of the downlink data. Specifically, the DCI includes a downlink assignment index (DAI), where the DAI is the index of the downlink data.

In this case, step 204 may include the following.

First, the terminal device determines, based on each piece of downlink data and the first indication information corresponding to each piece of downlink data received before the target TTI, first HARQ-ACK feedback information that needs to be fed back in the target TTI.

The terminal device may demodulate each piece of received downlink data, and determine, based on a demodulation result, HARQ-ACK feedback information corresponding to each piece of downlink data. Specifically, for a piece of downlink data, if the terminal device succeeds in demodulating the downlink data, the terminal device determines that a HARQ-ACK corresponding to the downlink data is an ACK, or if the terminal device fails in demodulating the downlink data, the terminal device determines that a HARQ-ACK corresponding to the downlink data is a negative acknowledgement (NACK).

In actual implementation, a packet loss may occur in a process of sending downlink data by the base station. Therefore, after the terminal device receives each piece of downlink data, the terminal device may detect, based on an index of each piece of received downlink data, whether there is a packet loss of downlink data. If there is a packet loss of downlink data, the terminal device determines that HARQ-ACK corresponding to lost downlink data is NACK feedback information. Specifically, the terminal device may detect whether the indexes of the downlink data are consecutive. If the indexes are not consecutive, the terminal device may determine that downlink data corresponding to a lost number is lost. In this case, the terminal device may determine that HARQ-ACK corresponding to the lost downlink data is a NACK.

For example, DAIs in DCI corresponding to downlink data received by the terminal device are 1, 3, 4, and 6. After the terminal device demodulates the downlink data, downlink data corresponding to DAIs 1, 3, and 6 is successfully demodulated, but downlink data corresponding to a DAI 4 is unsuccessfully demodulated. In addition, the terminal device may detect that there is a packet loss of downlink data corresponding to DAIs 2 and 5. Referring to Table 1, the first HARQ-ACK feedback information that is to be fed back in the target TTI and that is determined by the terminal device, is an ACK, a NACK, an ACK, a NACK, a NACK, and an ACK. The packet loss herein may mean that the base station sends the downlink data but the terminal device does not receive the downlink data, or the base station does not send the downlink data. This is not limited in this embodiment.

TABLE 1

| | DAI | | | |
|---|---|---|---|---|
| | 1 | 3 | 4 | 6 |
| HARQ-ACK | ACK | NACK | ACK | NACK NACK ACK |

The foregoing uses only an example in which each piece of downlink data corresponds to one HARQ-ACK bit. Optionally, if each piece of downlink data is sent using two code words, and each code word corresponds to one HARQ-ACK bit, referring to Table 2, the first HARQ-ACK feedback information that is to be fed back in the target TTI and that is determined by the terminal device is an ACK, an ACK, a NACK, a NACK, an ACK, an ACK, a NACK, a NACK, a NACK, a NACK, an ACK, and an ACK.

TABLE 2

| | DAI | | | | | |
|---|---|---|---|---|---|---|
| | 1 | 3 | 4 | | 6 | |
| HARQ-ACK | ACK and ACK | NACK and NACK | ACK and ACK | NACK and NACK | NACK and NACK | ACK and ACK |

Second, the terminal device determines second HARQ-ACK feedback information in the target TTI based on the second indication information.

When the second indication information is indication information that indicates a total number of bits of the HARQ-ACK feedback information in the target TTI, the terminal device determines that the number of pieces of HARQ-ACK feedback in the target TTI is the number indicated in the second indication information. Specifically, when a number that is of pieces of HARQ-ACK feedback in the first HARQ-ACK feedback information and that is determined by the terminal device is equal to the number indicated by the second indication information, no second HARQ-ACK feedback information exists. When a number that is of pieces of the HARQ-ACK feedback in first HARQ-ACK feedback information and that is determined by the terminal device is less than the number of bits indicated by the second indication information, the second HARQ-ACK feedback information determined by the terminal device is n pieces of NACK feedback, where n is a difference between the number of bits indicated by the second indication information and the number of pieces of the HARQ-ACK feedback in first HARQ-ACK feedback information.

An example in which the first HARQ-ACK feedback information determined by the terminal device is the HARQ-ACK feedback listed in Table 1, and the number of bits indicated by the second indication information is 7 is used for description. If there are six pieces of HARQ-ACK feedback in first HARQ-ACKs feedback information determined by the terminal device, the second HARQ-ACK feedback information determined by the terminal device is one piece of NACK. In this case, referring to Table 3, the HARQ-ACK feedback information that is in the target TTI and that is determined by the terminal device is an ACK, a NACK, an ACK, a NACK, a NACK, an ACK, and a NACK.

TABLE 3

| | DAI | | | |
|---|---|---|---|---|
| | 1 | 3 | 4 | 6 |
| HARQ-ACK | ACK NACK | ACK NACK | NACK | ACK NACK |

When the second indication information is the preset feedback delay, the step may include the following.

(1) Detect, based on the preset feedback delay and first indication information corresponding to a last piece of downlink data received before the target TTI, whether there is downlink data that has not been received after the last piece of downlink data is received and before the target TTI.

The base station may constantly send downlink data to the terminal device. Correspondingly, the terminal device may receive downlink data constantly sent by the base station. When the target TTI is reached, the terminal device detects, based on the preset feedback delay and the first indication information corresponding to the last piece of downlink data received before the target TTI, whether there is downlink data that has not been received.

Specifically, when the first indication information is a feedback delay of downlink data, the step includes: detecting whether a feedback delay of the last piece of downlink data received before the target TTI is greater than the preset feedback delay; and if a detection result is that the feedback delay is greater than the preset feedback delay, indicating that the base station may send other downlink data after receiving the last piece of downlink data, determining, by the terminal device, that there is downlink data that has not received; or if a detection result is that the feedback delay is not greater than the preset feedback delay, determining that there is no downlink data that has not been received.

For example, if the feedback delay of the last piece of downlink data is four TTIs, and the preset feedback delay is two TTIs, the terminal device determines that there are two pieces of downlink data that have not been received before the last piece of downlink data is obtained and before the target TTI.

When the first indication information is the index of the target TTI, the step includes: calculating a first difference between a TTI for receiving the last piece of downlink data and the target TTI, and detecting whether the first difference obtained through calculation is greater than the preset feedback delay; and if the first difference is greater than the preset feedback delay, indicating that the base station may send other downlink data after receiving the last piece of downlink data, determining, by the terminal device, that there is downlink data that has not been received; or if a detection result is that the first difference is not greater than the preset feedback delay, determining that there is no downlink data that has not been received.

For example, if a difference between the target TTI and the TTI corresponding to the last piece of downlink data received before the target TTI is five TTIs, and the preset feedback delay is two TTIs, the terminal device determines that there are three pieces of downlink data that have not been received after the last piece of downlink data is received and before the target TTI.

(2) If a detection result is that there is downlink data that has not been received, the terminal device determines, based on a detected number of downlink data that has not been received, the second HARQ-ACK feedback information that needs to be fed back in the target TTI.

When the first indication information is the feedback delay of the downlink data, the step includes: determining that the number of pieces of downlink data that have not been received is a difference between the preset feedback delay and the feedback delay of the last piece of downlink data received before the target TTI, and determining NACK feedback whose number is the difference obtained through calculation.

When the first indication information is the index of the target TTI, the step includes: determining that the number of pieces of downlink data that have not been received is a second difference between the first difference and the preset feedback delay, and determining NACK feedback whose number is the second difference.

The obtained NACK feedback determined in this step is the second HARQ-ACK feedback information. In addition, the terminal device determines that the obtained HARQ-ACK feedback information in the target TTI includes the first HARQ-ACK feedback information and the second HARQ-ACK feedback information.

Figure 3A:
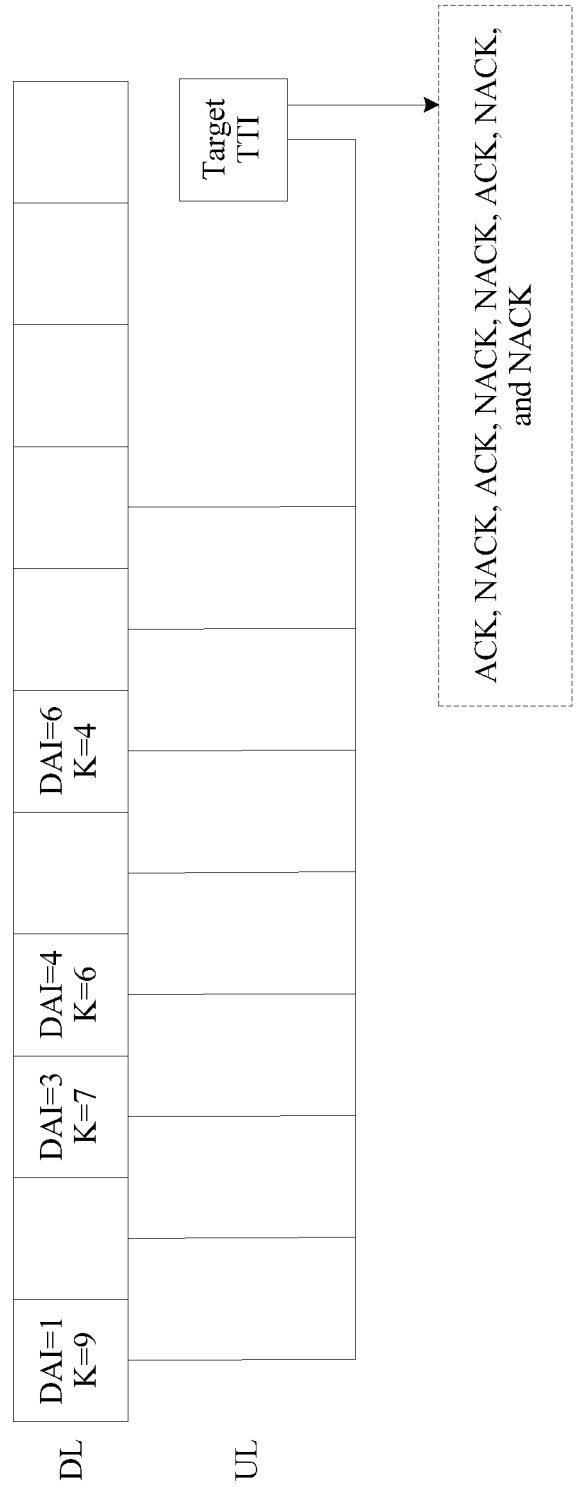
FIG. 3A is a schematic diagram of HARQ-ACK feedback information determined by a terminal device according to an embodiment of this application.

For example, the first HARQ-ACK feedback information determined by the terminal device is shown in Table 1, a delay corresponding to the last piece of downlink data is four TTIs, and the preset feedback delay is two TTIs. Referring to FIG. 3A, the HARQ-ACK feedback information that is in the target TTI and that is determined by the terminal device is an ACK, a NACK, an ACK, a NACK, a NACK, an CK, a NACK, and a NACK.

(3) If the detection result is that there is no downlink data that has not been received, the procedure ends.

In this case, the terminal device determines that the obtained HARQ-ACK feedback information in the target TTI is the first HARQ-ACK feedback information.

Figure 3B:
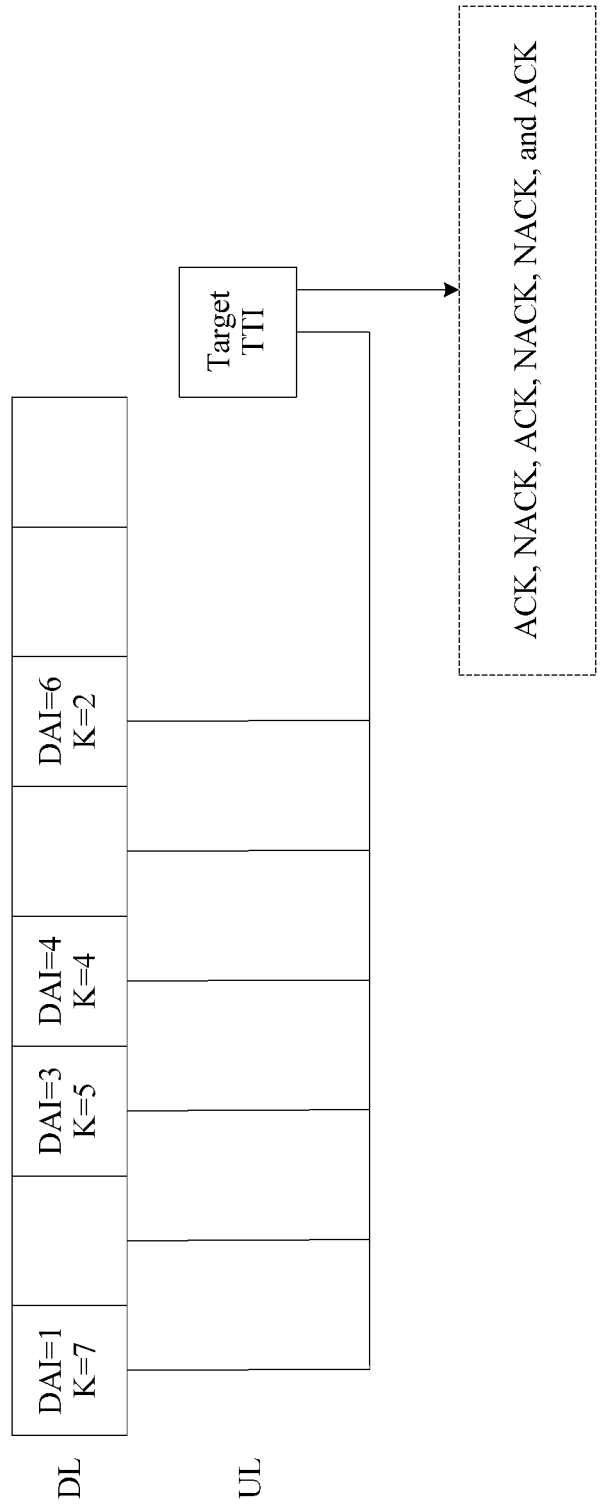
FIG. 3B is another schematic diagram of HARQ-ACK feedback information determined by a terminal device according to an embodiment of this application.

For example, the first HARQ-ACK feedback information determined by the terminal device is shown in Table 1, a delay corresponding to the last piece of downlink data is two TTIs, and the preset feedback delay is two TTIs. Referring to FIG. 3B, the HARQ-ACK feedback information that is in the target TTI and that is determined by the terminal device is an ACK, a NACK, an ACK, a NACK, a NACK, and an ACK.

Figure 3C:
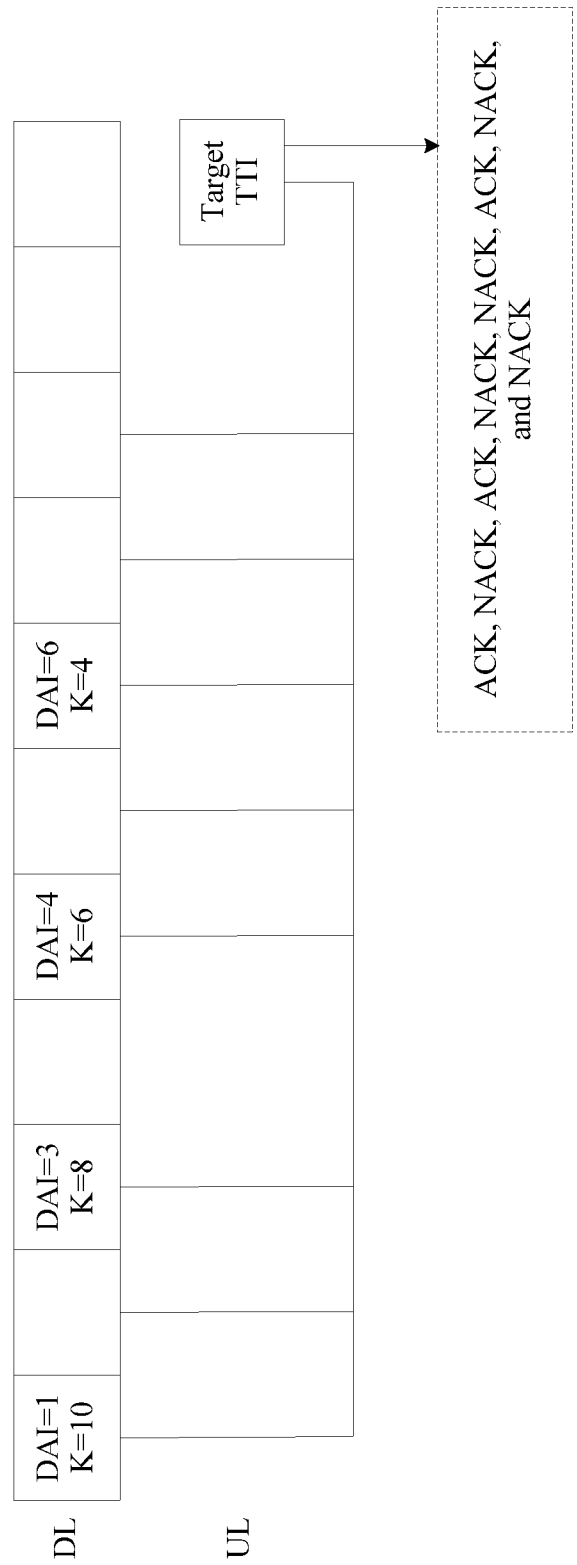
FIG. 3C is still another schematic diagram of HARQ-ACK feedback information determined by a terminal device according to an embodiment of this application.

It should be noted that the base station may not schedule some TTIs that can be used for downlink data transmission. In this case, the terminal device does not feed back HARQ-ACK feedback information corresponding to the TTIs that are not scheduled and that can be used for downlink data transmission. For example, referring to FIG. 3C, the terminal device determines that the obtained HARQ-ACK feedback information is an ACK, a NACK, an ACK, a NACK, a NACK, an ACK, a NACK, and a NACK.

In a second case, when the base station performs SPS, step 201 may include the following. The base station sends the DCI to the terminal device, where the DCI includes the first indication information and a field used to indicate SPS, and the DCI is used to activate SPS transmission; and then the base station sends the downlink data to the terminal device according to a preset time interval. Each piece of downlink data that is sent after the DCI by the base station and that is transmitted based on SPS corresponds to the DCI, and the first indication information is indication information corresponding to each piece of downlink data in a semi-persistent scheduling process.

In this case, step 204 may include the following.

First, the terminal device determines first HARQ-ACK feedback information in the target TTI based on each piece of downlink data and the first indication information.

For each piece of downlink data, the terminal device demodulates the received downlink data. If the demodulation succeeds, the terminal device determines that HARQ-ACK corresponding to the downlink data is an ACK; or if the demodulation fails, the terminal device determines that HARQ-ACK information corresponding to the downlink data is a NACK.

In addition, the base station sends downlink data at each preset time interval. Therefore, if the terminal device does not receive downlink data at a preset time interval, the terminal device may determine that the downlink data at the time interval is lost, and HARQ-ACK feedback corresponding to the downlink data is a NACK.

For example, the preset time interval is 10 TTIs. After the base station sends the DCI to the terminal device, the base station may send downlink data to the terminal device, and send one piece of downlink data to the terminal device at an interval of 10 TTIs. After the terminal device receives a first piece of downlink data sent by the base station, if the terminal device does not receive downlink data at an interval of 10 TTIs, and receives downlink data at an interval of 20 TTIs, the terminal device may determine that downlink data at the interval of 10 TTIs is lost. In this case, the terminal device may determine that HARQ-ACK at the interval of 10 TTIs is a NACK.

Second, the terminal device determines second HARQ-ACK feedback information in the target TTI based on the second indication information.

The step is similar to an implementation used in the dynamic scheduling, and details are not described herein again in this embodiment.

In a third case, when the base station uses both dynamic scheduling and SPS, implementation thereof may be performed with reference to the foregoing two implementations, and details are not described herein again in this embodiment.

Figure 3D:
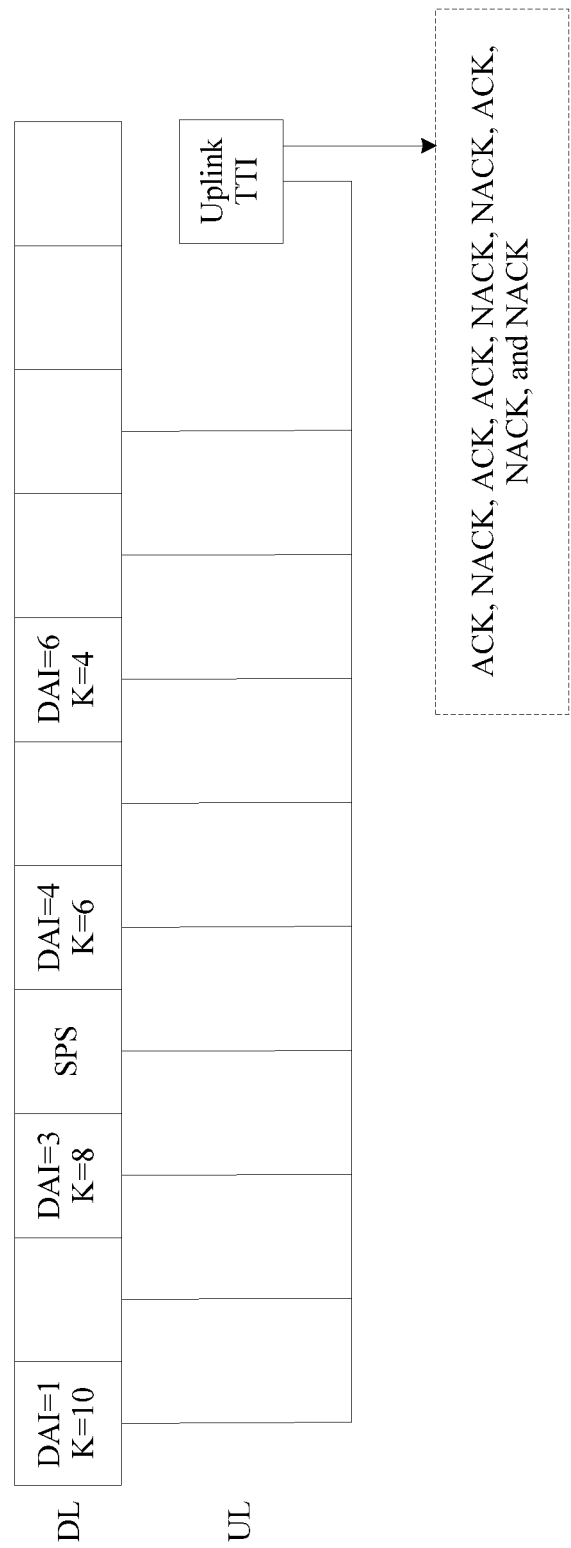
FIG. 3D is still another schematic diagram of HARQ-ACK feedback information determined by a terminal device according to an embodiment of this application.

For example, FIG. 3D shows HARQ-ACK feedback information determined by the terminal device, when dynamic scheduling and SPS correspond to a same target TTI, the preset feedback delay is two TTIs, and the terminal device succeeds in demodulating semi-persistent scheduled downlink data, and a demodulation status of dynamically scheduled downlink data is shown in Table 1.

It should be noted that, after the terminal device determines the HARQ-ACK feedback information in the target TTI, the terminal device may sort the determined HARQ-ACK feedback information, and feed back, to the base station, the HARQ-ACK feedback information sorted according to a preset order.

Specifically, when the base station uses the dynamic scheduling, the terminal device may sort the HARQ-ACK feedback information in ascending order of numbers of downlink data, and HARQ-ACK feedback corresponding to downlink data that is lost after the last piece of downlink data is received and before the target TTI is placed at the last. The foregoing merely uses an example in which sorting is performed based on an ascending order of numbers of downlink data. Optionally, the terminal device may alternatively perform sorting in descending order of numbers of downlink data. This is not limited in this embodiment. When the base station uses the semi-persistent scheduling, the terminal device performs sorting according to an order of times at which corresponding downlink data is received. When the base station uses the dynamic scheduling and the semi-persistent scheduling, the terminal device may perform sorting with reference to the foregoing two sorting manners, or HARQ-ACK feedback information that is scheduled in SPS may be placed at the first or last. This is not limited in this embodiment.

It should be further noted that, in actual implementation, a TTI that is not used for downlink data transmission exists after the last piece of downlink data is received and before the target TTI. Therefore, after the terminal device determines the second HARQ-ACK feedback information according to the foregoing method, the terminal device needs to remove, from the determined second HARQ-ACK feedback information, HARQ-ACK feedback corresponding to the TTI that is not used for downlink data transmission. For example, if the method is used in a system with a fixed subframe ratio, the terminal device may learn, based on the subframe ratio, whether a TTI that is not used for downlink data transmission exists after the last piece of downlink data is received and before the target TTI.

It should be further noted that, in the foregoing embodiments, the second indication information may be information pre-agreed between the base station and the terminal device, information sent by the base station to the terminal device, or information sent by the terminal device to the base station.

Figure 3E:
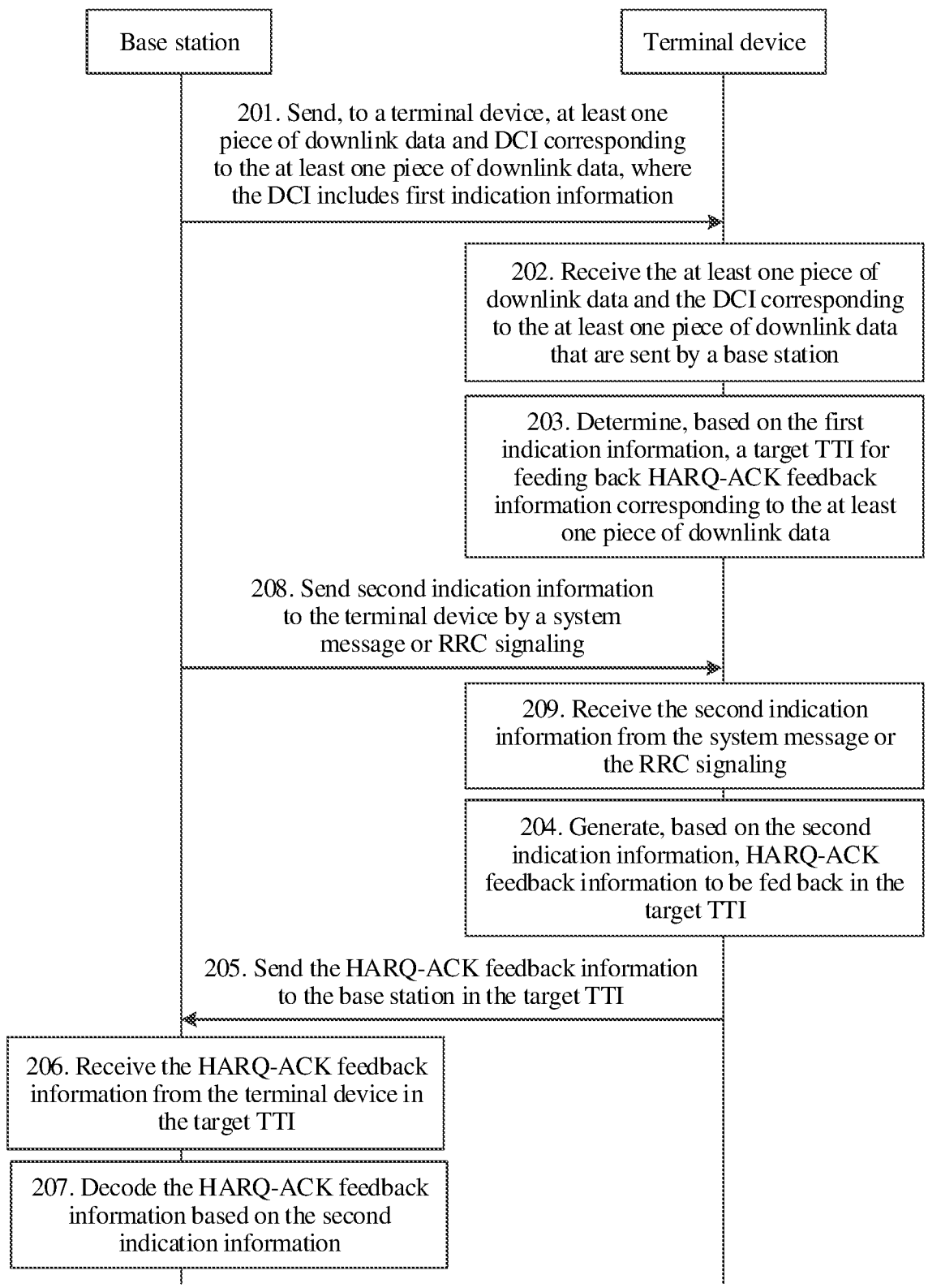
FIG. 3E is another flowchart of a HARQ-ACK feedback method according to an embodiment of this application.

If the second indication information is configured by the base station for the terminal device, in a possible implementation, the DCI corresponding to the at least one piece of downlink data sent by the base station includes the second indication information. In another possible implementation, referring to FIG. 3E, before step 204, the method further includes the following steps.

Step 208: The base station sends the second indication information to the terminal device by a system message or RRC signaling.

Step 209: The terminal device receives the second indication information in the system message or the RRC signaling.

Optionally, after the terminal device receives the second indication information, the terminal device may send acknowledgement information to the base station. This is not limited in this embodiment.

Figure 3F:
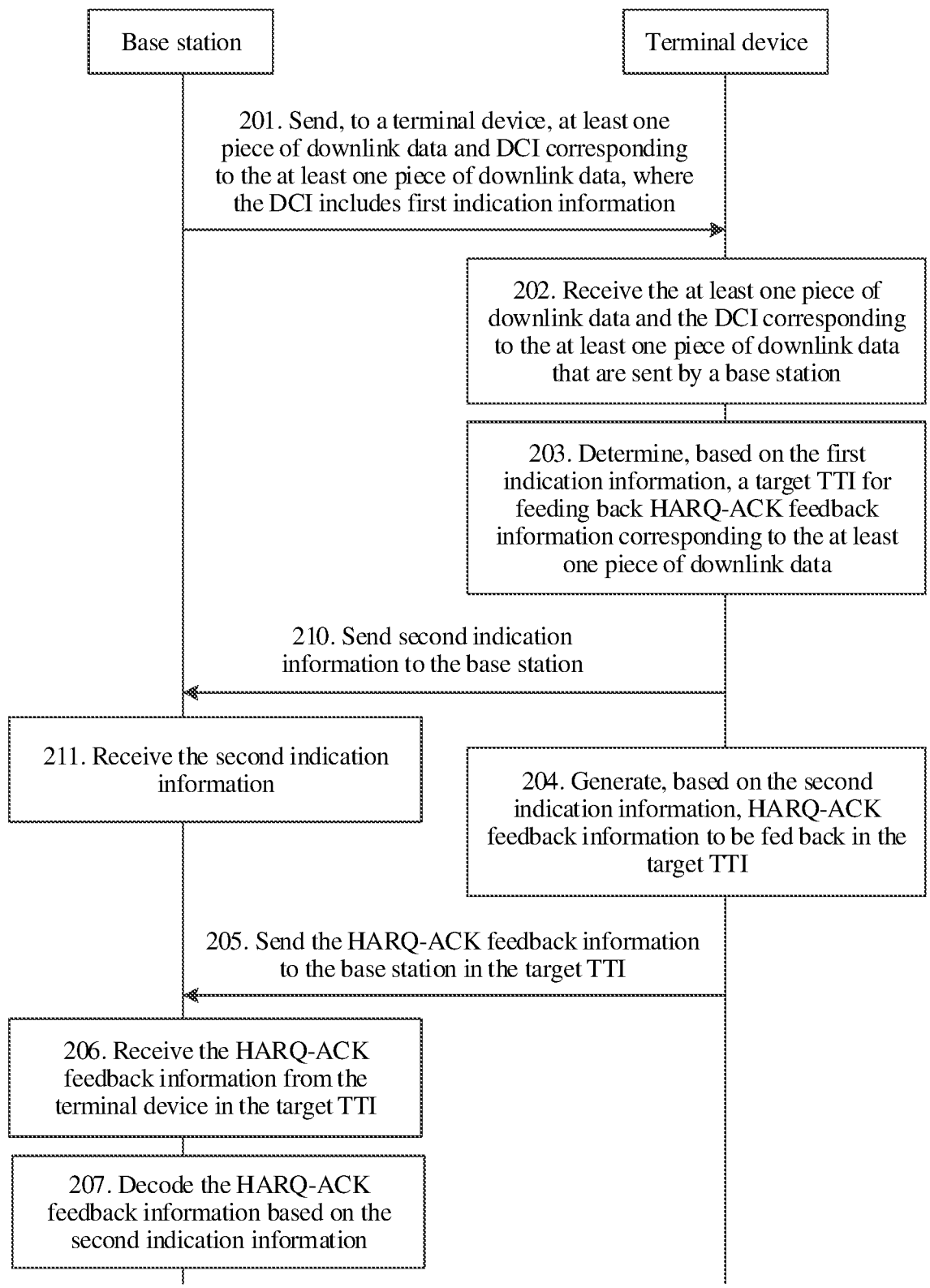
FIG. 3F is still another flowchart of a HARQ-ACK feedback method according to an embodiment of this application.

If the second indication information is sent by the terminal device to the base station, referring to FIG. 3F, before step 204, the method may further include the following steps.

Step 210: The terminal device sends the second indication information to the base station.

Optionally, the terminal device may proactively report the second indication information to the base station, or the terminal device reports the second indication information to the base station after the terminal device receives a reporting request sent by the base station. Optionally, the terminal device may report the preset feedback delay to the base station using a PUCCH or a PUSCH.

Step 211: The base station receives the second indication information.

Optionally, after the base station receives the second indication information, the base station may return acknowledgement information to the terminal device.

It should be noted that the steps on the base station side may be independently implemented as the HARQ-ACK feedback method on the base station side, and the steps on the terminal device side may be independently implemented as the HARQ-ACK feedback method on the terminal device side. In addition, sequence numbers of the steps do not mean an execution sequence in this embodiment of this application. The execution sequence of the steps should be determined according to functions and internal logic of the steps, and should not be construed as any limitation on the implementation processes of this embodiment of this application.

Figure 4:
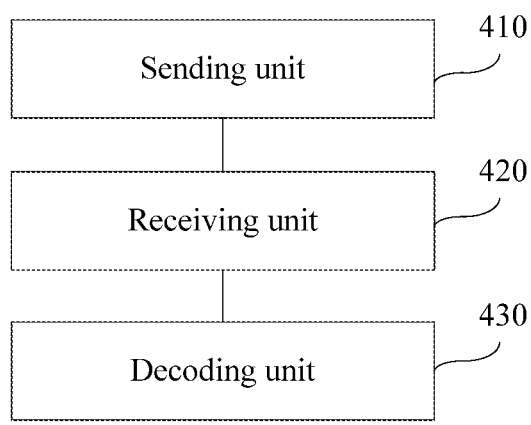
FIG. 4 is a schematic structural diagram of a HARQ-ACK feedback apparatus according to an embodiment of this application.

FIG. 4 is a schematic structural diagram of a HARQ-ACK feedback apparatus according to an embodiment of this application. The HARQ-ACK feedback apparatus may be used in a network device. As shown in FIG. 4, the HARQ-ACK feedback apparatus may include a sending unit 410, a receiving unit 420, and a decoding unit 430.

The sending unit 410 is configured to send, to a terminal device, at least one piece of downlink data and downlink control information (DCI) corresponding to the at least one piece of downlink data. The DCI includes first indication information, the first indication information indicates a target transmission time interval (TTI) for transmitting HARQ-ACK feedback information corresponding to the at least one piece of downlink data, and the HARQ-ACK feedback information indicates a reception status of the at least one piece of downlink data.

The receiving unit 420 is configured to receive the HARQ-ACK feedback information from the terminal device in the target TTI.

The decoding unit 430 is configured to decode the HARQ-ACK feedback information based on second indication information, where the second indication information indicates the number of bits of the HARQ-ACK feedback information.

In conclusion, the HARQ-ACK feedback apparatus provided in this embodiment of the present invention sends, to the terminal device, the at least one piece of downlink data and the DCI corresponding to the at least one piece of downlink data, so that after receiving the DCI and the downlink data sent by the network device, the terminal device determines the target TTI based on the first indication information in the DCI, generates the HARQ-ACK feedback information that needs to be fed back in the target TTI, and feeds back the generated HARQ-ACK feedback information to the network device in the target TTI. This resolves a problem that a terminal device cannot correctly feed back a HARQ-ACK. Therefore, the terminal device can still correctly feed back a HARQ-ACK corresponding to a lost packet even though there is a packet loss after a last piece of downlink data is received before the target TTI.

Optionally, the second indication information includes a preset feedback delay, and the second indication information indicates the number of bits of the HARQ-ACK feedback information by the preset feedback delay.

Optionally, the network device and the terminal device prestore the second indication information; or the network device sends the second indication information to the terminal device by the DCI; or the network device sends the second indication information to the terminal device by a system message or radio resource control (RRC) signaling; or the network device receives the second indication information from the terminal device.

Optionally, the first indication information includes: a feedback delay of the at least one piece of downlink data, where the feedback delay is a time difference between the target TTI and a TTI for transmitting the downlink data; or an index of the target TTI.

Optionally, the DCI further includes: an index of the at least one piece of downlink data.

Figure 5:
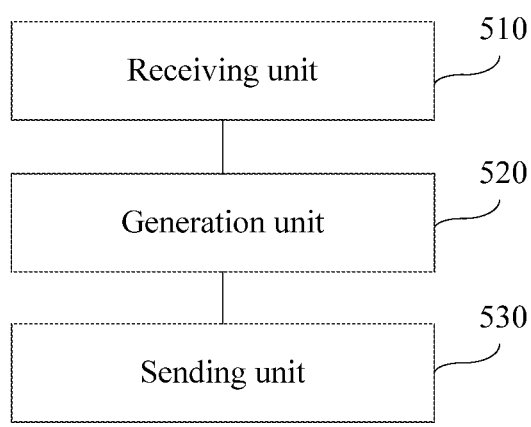
FIG. 5 is a schematic structural diagram of a HARQ-ACK feedback apparatus according to an embodiment of this application.

FIG. 5 is a schematic structural diagram of a HARQ-ACK feedback apparatus according to an embodiment of this application. The HARQ-ACK feedback apparatus may be used in a terminal device. As shown in FIG. 5, the HARQ-ACK feedback apparatus may include a receiving unit 510, a generation unit 520, and a sending unit 530.

The receiving unit 510 is configured to receive at least one piece of downlink data and downlink control information (DCI) corresponding to the at least one piece of downlink data sent by a network device. The DCI includes first indication information, the first indication information indicates a target transmission time interval (TTI) for transmitting HARQ-ACK feedback information corresponding to the at least one piece of downlink data, and the HARQ-ACK feedback information indicates a reception status of the at least one piece of downlink data.

The generation unit 520 is configured to generate the HARQ-ACK feedback information based on second indication information, where the second indication information indicates the number of bits of the HARQ-ACK feedback information.

The sending unit 530 is configured to send the HARQ-ACK feedback information to the network device in the target TTI.

In conclusion, the HARQ-ACK feedback apparatus provided in this embodiment receives the at least one piece of downlink data and the DCI corresponding to the at least one piece of downlink data sent by the network device, then determines the target TTI based on the first indication information in the DCI, generates the HARQ-ACK feedback information that needs to be fed back in the target TTI, and feeds back the generated HARQ-ACK feedback information to the network device in the target TTI. This resolves a problem that a terminal device cannot correctly feed back HARQ-ACK feedback information. Therefore, the terminal device can still feed back HARQ-ACK feedback information corresponding to a lost packet even though there is a packet loss after a last piece of downlink data is received before the target TTI.

Optionally, the second indication information includes a preset feedback delay, and the second indication information indicates the number of bits of the HARQ-ACK feedback information by the preset feedback delay.

Optionally, the network device and the terminal device prestore the second indication information; or the terminal device receives the second indication information in the DCI; or the terminal device receives the second indication information in a system message or radio resource control (RRC) signaling; or the terminal device sends the second indication information to the network device.

Optionally, the generation unit 520 is further configured to: determine, based on each piece of downlink data and first indication information corresponding to each piece of downlink data received before the target TTI, first HARQ-ACK feedback information that needs to be fed back in the target TTI; detect, based on the preset feedback delay and first indication information corresponding to a last piece of downlink data received before the target TTI, whether there is downlink data that has not been received after the last piece of downlink data is received and before the target TTI; and if a detection result is that there is downlink data that has not been received, determine, based on a detected number of pieces of downlink data that have not been received, second HARQ-ACK feedback information that needs to be fed back in the target TTI.

Optionally, the DCI further includes an index of the at least one piece of downlink data, and the generation unit 520 is further configured to: for each piece of downlink data, determine, based on a demodulation result of the downlink data, HARQ-ACK corresponding to the downlink data; detect, based on an index of each piece of received downlink data, whether there is a packet loss; and if a detection result is that there is a packet loss, determine that HARQ-ACK corresponding to lost downlink data is NACK feedback.

Optionally, the generation unit 520 is further configured to: for each piece of downlink data, determine, based on a demodulation result of the downlink data, a HARQ-ACK corresponding to the downlink data; after receiving the DCI, detect whether there is a packet loss at each preset time interval before the target TTI; and if a detection result is that there is a packet loss, determine that a HARQ-ACK corresponding to lost downlink data is NACK feedback.

Optionally, the generation unit 520 is further configured to: send, to the network device in the target TTI, the HARQ-ACK feedback information sorted according to a preset order, where the preset order is an order that is pre-agreed between the terminal device and the network device.

Optionally, the first indication information includes: a feedback delay of the at least one piece of downlink data, where the feedback delay is a time difference between the target TTI and a TTI for transmitting the downlink data; or an index of the target TTI.

The foregoing mainly describes the solutions provided in the embodiments of this application from a perspective of interaction between the base station and the terminal device. It may be understood that, to implement the foregoing functions, the base station and the terminal device include corresponding hardware structures and/or software modules for performing the functions. Units and algorithm steps of the examples described in combination with the embodiments disclosed in this application may be implemented by hardware or a combination of hardware and computer software in the embodiments of this application. Whether a function is performed by hardware or hardware driven by computer software depends on particular applications and design constraints of the technical solutions. For each particular application, persons skilled in the art may use different methods to implement the described functions, but it should not be considered that the implementation goes beyond the scope of the technical solutions of the embodiments of this application.

Figure 6:
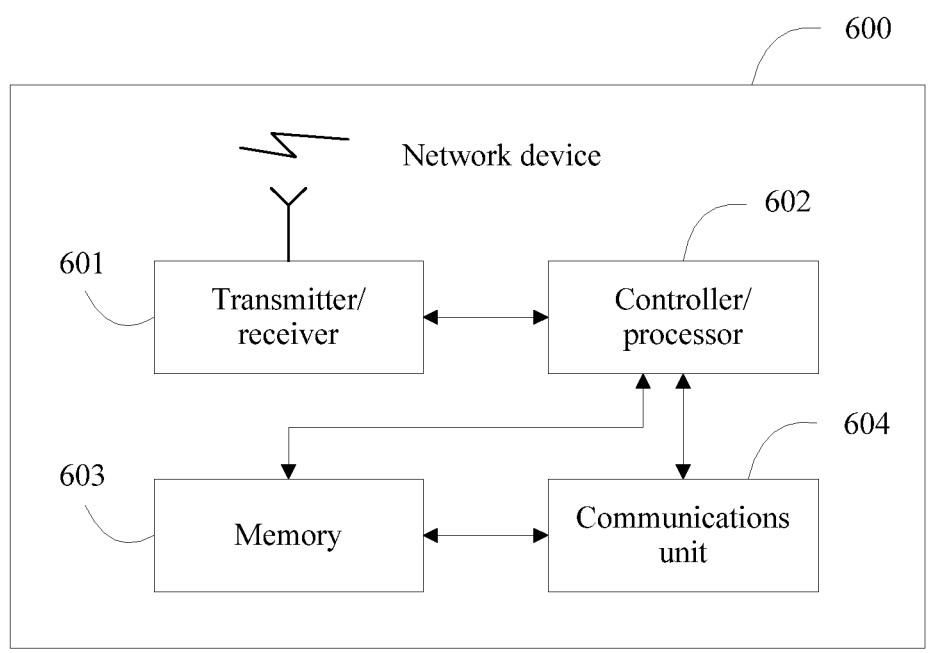
FIG. 6 is a schematic structural diagram of a network device according to an embodiment of this application.

FIG. 6 is a possible schematic structural diagram of a network device according to an embodiment of this application.

A base station 600 includes a transmitter/receiver 601 and a processor 602. The processor 602 may be a controller, and is represented as "controller/processor 602" in FIG. 6. The transmitter/receiver 601 is configured to support information transmission and reception between the base station and the terminal device in the foregoing embodiment and support radio communication between the terminal device and another terminal device. The processor 602 performs various functions for communicating with the terminal device. On an uplink, an uplink signal from the terminal device is received using an antenna, is demodulated (for example, a high frequency signal is demodulated to obtain a baseband signal) by the receiver 601, and is further processed by the processor 602 to restore service data and signaling information sent by the terminal device. On a downlink, service data and a signaling message are processed by the processor 602, and are modulated (for example, a baseband signal is modulated to obtain a high frequency signal) by the transmitter 601 to generate a downlink signal, and the downlink signal is transmitted to the terminal device using an antenna. It should be noted that the modulation or demodulation function may be alternatively implemented by the processor 602. For example, the processor 602 is further configured to execute the processes 201 and 206 of FIG. 2, and/or another process of the technical solutions described in this application.

Further, the base station 600 may further include a memory 603, and the memory 603 is configured to store program code and data of the base station 600. In addition, the base station may further include a communications unit 604. The communications unit 604 is configured to support communication between the base station and another network entity (for example, a network device on a core network). For example, in an LTE system, the communications unit 604 may be an S1-U interface, configured to support communication between the base station and a serving gateway (SGW), or the communications unit 604 may be an S1-MME interface, configured to support communication between the base station and a mobility management entity (MME).

It may be understood that FIG. 6 shows merely a simplified design of the base station 600. In actual application, the base station 600 may include any quantities of transmitters, receivers, processors, controllers, memories, communications units, and the like. All base stations that can implement the embodiments of this application fall within the protection scope of the embodiments of this application.

Figure 7:
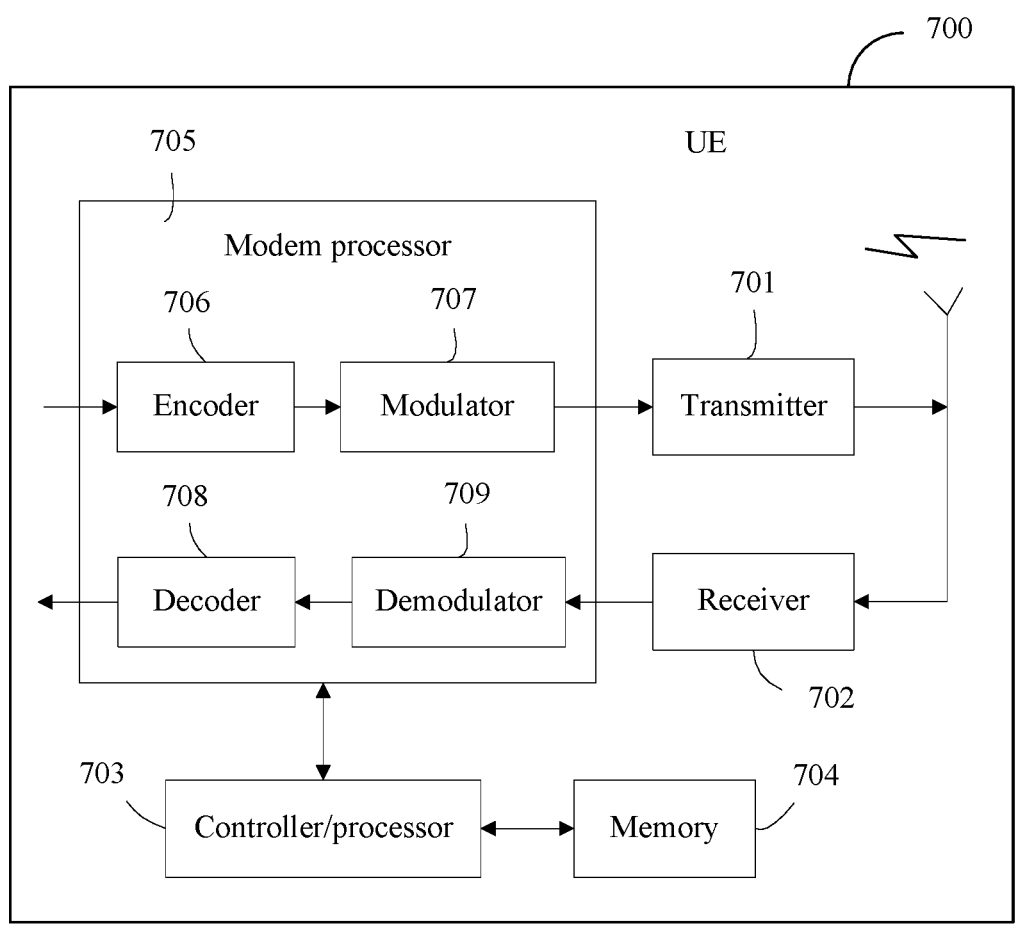
FIG. 7 is a schematic structural diagram of a terminal device according to an embodiment of this application.

FIG. 7 is a simplified schematic diagram of a possible design structure of a terminal device according to an embodiment of this application. A terminal device 700 includes a transmitter 701, a receiver 702, and a processor 703. The processor 703 may be a controller, and is represented as "controller/processor 703" in FIG. 7. Optionally, the terminal device 700 may further include a modem processor 705. The modem processor 705 may include an encoder 706, a modulator 707, a decoder 708, and a demodulator 709.

For example, the transmitter 701 adjusts (for example, performs digital-analog conversion, filtering, amplification, and up-conversion on) an output sample and generates an uplink signal. The uplink signal is transmitted to the base station in the foregoing embodiment by using an antenna. On a downlink, an antenna receives a downlink signal transmitted by the base station in the foregoing embodiment. The receiver 702 adjusts (for example, performs filtering, amplification, down conversion, and digitalization on) a signal received from the antenna and provides an input sample. In the modem processor 705, the encoder 706 receives service data and a signaling message that are to be sent on an uplink, and processes (for example, formats, encodes, and interleaves) the service data and the signaling message. The modulator 707 further processes (for example, performs symbol mapping and modulation on) encoded service data and an encoded signaling message and provides an output sample. The demodulator 709 processes (for example, demodulates) the input sample and provides symbol estimation. The decoder 708 processes (for example, de-interleaves and decodes) the symbol estimation and provides decoded data and a decoded signaling message sent to the terminal device 700. The encoder 706, the modulator 707, the demodulator 709, and the decoder 708 may be implemented by the combined modem processor 705. These units perform processing according to a radio access technology (for example, an access technology used by an LTE system and other evolved systems) used by a radio access network. It should be noted that, when the terminal device 700 does not include the modem processor 705, the foregoing functions of the modem processor 705 may alternatively be implemented by using the processor 703.

The processor 703 controls and manages an action of the terminal device 700, to perform a processing process implemented by the terminal device 700 in the foregoing embodiment of this application. For example, the processor 703 is further configured to execute the processes 202, 203, 204, and 205 of FIG. 2, and/or another process of the technical solutions described in this application.

Further, the terminal device 700 may further include a memory 704, and the memory 704 is configured to store program code and data of the terminal device 700.

The processor configured to execute the functions of the base station or the terminal device in the embodiments of this application may be a central processing unit (CPU), a general purpose processor, a digital signal processor (DSP), an application-specific integrated circuit (ASIC), a field programmable gate array (FPGA) or other programmable logic device, a transistor logic device, a hardware component, or any combination thereof. The processor can implement or execute various logical blocks, modules, and circuits that are described as examples with reference to content disclosed in the embodiments of this application. Alternatively, the processor may be a combination of processors implementing a computing function, for example, a combination of one or more microprocessors, or a combination of the DSP and a microprocessor.

Methods or algorithm steps described in combination with the content disclosed in the embodiments of this application may be implemented by hardware, or may be implemented by a processor by executing a software instruction. The software instruction may be constituted by a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a base station or a terminal device. Certainly, the processor and the storage medium may alternatively exist in a base station or a terminal device as discrete components.

Persons skilled in the art should be aware that in the foregoing one or more examples, functions described in the embodiments of this application may be implemented by hardware, software, firmware, or any combination thereof. When being implemented by software, these functions may be stored in a computer readable medium or transmitted as one or more instructions or code in the computer readable medium. The computer readable medium includes a computer storage medium and a communications medium. The communications medium includes any medium that facilitates a computer program to be transmitted from one place to another. The storage medium may be any available medium accessible to a general-purpose or dedicated computer.

An embodiment of this application further provides a HARQ-ACK feedback apparatus. The apparatus includes a processor and a memory. The memory stores at least one instruction, at least one program segment, a code set, or an instruction set. The at least one instruction, at least one program segment, the code set, or the instruction set is loaded and executed by a processor to implement the HARQ-ACK feedback method on a network device side in the foregoing embodiment.

An embodiment of this application further provides a computer readable storage medium. The storage medium stores at least one instruction, at least one program segment, a code set, or an instruction set. The at least one instruction, the at least one program segment, the code set, or the instruction set is loaded and executed by a processor to implement the HARQ-ACK feedback method on a network device side in the foregoing embodiment.

An embodiment of this application further provides a HARQ-ACK feedback apparatus. The apparatus includes a processor and a memory. The memory stores at least one instruction, at least one program segment, a code set, or an instruction set. The at least one instruction, the at least one program segment, the code set, or the instruction set is loaded and executed by the processor to implement the HARQ-ACK feedback method on a terminal device side in the foregoing embodiment.

An embodiment of this application further provides a computer readable storage medium. The storage medium stores at least one instruction, at least one program segment, a code set, or an instruction set. The at least one instruction, the at least one program segment, the code set, or the instruction set is loaded by a processor to implement the HARQ-ACK feedback method on a terminal device side in the foregoing embodiment.

In the foregoing specific implementations, the objectives, technical solutions, and benefits of the embodiments of this application are further described in detail. It should be understood that the foregoing descriptions are merely specific implementations of the embodiments of this application, but are not intended to limit the protection scope of the embodiments of this application. Any modification, equivalent replacement, or improvement made based on technical solutions of the embodiments of this application shall fall within the protection scope of the embodiments of this application.

The sequence numbers of the foregoing embodiments of this application are merely for illustrative purposes, and are not intended to indicate priorities of the embodiments.

Persons of ordinary skill in the art may understand that all or some of the steps of the embodiments may be implemented by hardware or a program instructing related hardware. The program may be stored in a computer readable storage medium. The storage medium may include a read-only memory, a magnetic disk, or an optical disc.

The invention claimed is:

1. A method, comprising:
sending, by a network device to a terminal device, second indication information using radio resource control (RRC) signaling, wherein the second indication information indicates a preset feedback delay, and the preset feedback delay indicates a count of bits of hybrid automatic repeat request-acknowledgment (HARQ-ACK) feedback information corresponding to a first piece of downlink data;
sending, by the network device to the terminal device, the first piece of downlink data and downlink control information (DCI) corresponding to the first piece of downlink data, wherein the first piece of downlink data is sent using a single code word or a plurality of code words, the DCI comprises first indication information, the first indication information indicates a target time unit for transmitting the HARQ-ACK feedback information corresponding to the first piece of downlink data, and the HARQ-ACK feedback information indicates a reception status of the first piece of downlink data;
receiving, by the network device, the HARQ-ACK feedback information from the terminal device during the target time unit; and
decoding, by the network device, the HARQ-ACK feedback information based on the second indication information.

2. The method according to claim 1, wherein the first indication information indicates:
a first feedback delay of the first piece of downlink data, wherein the first feedback delay is a time difference between the target time unit and a time unit used to transmit the first piece of downlink data; or
an index of the target time unit.

3. The method according to claim 1, wherein the target time unit is a transmission time interval (TTI) or a subframe.

4. The method according to claim 1, wherein the first piece of downlink data is scheduled dynamically or semi-persistently.

5. A method, comprising:
receiving, by a terminal device from a network device using radio resource control (RRC) signaling, second indication information indicating a preset feedback delay, wherein the preset feedback delay indicates a count of bits of hybrid automatic repeat request-acknowledgment (HARQ-ACK) feedback information corresponding to a first piece of downlink data;
receiving, by the terminal device from the network device, the first piece of downlink data and downlink control information (DCI) corresponding to the first piece of downlink data, wherein the first piece of downlink data is received using a single code word or a plurality of code words, the DCI comprises first indication information, the first indication information indicates a target time unit for transmitting the HARQ-ACK feedback information corresponding to the first piece of downlink data, and the HARQ-ACK feedback information indicates a reception status of the first piece of downlink data;
generating, by the terminal device, the HARQ-ACK feedback information based on the second indication information; and
sending, by the terminal device, the HARQ-ACK feedback information to the network device in the target time unit.

6. The method according to claim 5, wherein the target time unit is a transmission time interval (TTI) or a subframe.

7. The method according to claim 5, wherein the first piece of downlink data is scheduled dynamically or semi-persistently.

8. The method according to claim 5, wherein the first indication information indicates:
a first feedback delay of the first piece of downlink data, wherein the first feedback delay is a time difference between the target time unit and a time unit used to transmit the first piece of downlink data; or
an index of the target time unit.

9. An apparatus, comprising:
a receiver, configured to:
receive second indication information from a network device using radio resource control (RRC) signaling, wherein the second indication information indicates a preset feedback delay, and the preset feedback delay indicates a count of bits of hybrid automatic repeat request-acknowledgment (HARQ-ACK) feedback information corresponding to a first piece of downlink data;
receive, from the network device, the first piece of downlink data and downlink control information (DCI) corresponding to the first piece of downlink data, wherein the first piece of downlink data is received using a single code word or a plurality of code words, the DCI comprises first indication information, the first indication information indicates a target time unit for transmitting the HARQ-ACK feedback information corresponding to the first piece of downlink data, and the HARQ-ACK feedback information indicates a reception status of the first piece of downlink data;
at least one processor, configured to generate the HARQ-ACK feedback information based on the second indication information; and
a transmitter, configured to send the HARQ-ACK feedback information to the network device during the target time unit.

10. The apparatus according to claim 9, wherein the target time unit is a transmission time interval (TTI) or a subframe.

11. The apparatus according to claim 9, wherein the first piece of downlink data is scheduled dynamically or semi-persistently.

12. The apparatus according to claim 9, wherein the first indication information indicates:
a first feedback delay of the first piece of downlink data, wherein the first feedback delay is a time difference between the target time unit and a time unit used to transmit the first piece of downlink data; or
an index of the target time unit.

13. A system, comprising:
a network device; and
a terminal device;
wherein the network device is configured to send, to a terminal device using radio resource control (RRC) signaling, second indication information indicating a preset feedback delay, wherein the preset feedback delay indicates a count of bits of hybrid automatic repeat request-acknowledgment (HARQ-ACK) feedback information corresponding to a first piece of downlink data; and
send, to the terminal device, the first piece of downlink data and downlink control information (DCI) corresponding to the first piece of downlink data, wherein the first piece of downlink data is sent using a single code word or a plurality of code words, the DCI comprises first indication information, the first indication information indicates a target time unit for transmitting the HARQ-ACK feedback information corresponding to the first piece of downlink data, and the HARQ-ACK feedback information indicates a reception status of the first piece of downlink data;
wherein the terminal device is configured to:
receive the second indication information and the first piece of downlink data and the downlink control information (DCI);
generate the HARQ-ACK feedback information based on the second indication information; and
send the HARQ-ACK feedback information to the network device during the target time unit; and
wherein the network device is further configured to:
receive the HARQ-ACK feedback information from the terminal device during the target time unit; and
decode the HARQ-ACK feedback information based on the second indication information.

14. The system according to claim 13, wherein the target time unit is a transmission time interval (TTI) or a subframe.

15. The system according to claim 13, wherein the first piece of downlink data is scheduled dynamically or semi-persistently.

16. The system according to claim 13, wherein the first indication information indicates:
a first feedback delay of the first piece of downlink data, wherein the first feedback delay is a time difference between the target time unit and a time unit used to transmit the downlink data; or
an index of the target time unit.

17. An apparatus, comprising:
a transmitter, configured to:
send, using radio resource control (RRC) signaling, second indication information to a terminal device, wherein the second indication information indicates a preset feedback delay, and the preset feedback delay indicates a count of bits of hybrid automatic repeat request-acknowledgment (HARQ-ACK) feedback information corresponding to a first piece of downlink data; and
send the first piece of downlink data and downlink control information (DCI) corresponding to the first piece of downlink data to the terminal device, wherein the first piece of downlink data is sent using a single code word or a plurality of code words, the DCI comprises first indication information, the first indication information indicates a target time unit for transmitting the HARQ-ACK feedback information corresponding to the first piece of downlink data, and the HARQ-ACK feedback information indicates a reception status of the first piece of downlink data;
a receiver, configured to receive the HARQ-ACK feedback information from the terminal device during the target time unit; and
at least one processor, configured to decode the HARQ-ACK feedback information based on second indication information.

18. The apparatus according to claim 17, wherein the first indication information indicates:
a first feedback delay of the first piece of downlink data, wherein the first feedback delay is a time difference between the target time unit and a time unit used to transmit the first piece of downlink data; or
an index of the target time unit.

19. The apparatus according to claim 17, wherein the target time unit is a transmission time interval (TTI) or a subframe.

20. The apparatus according to claim 17, wherein the first piece of downlink data is scheduled dynamically or semi-persistently.

* * * * *